US006976177B2

(12) United States Patent
Ahonen (10) Patent No.: US 6,976,177 B2
(45) Date of Patent: Dec. 13, 2005

(54) VIRTUAL PRIVATE NETWORKS

(75) Inventor: Pasi Matti Kalevi Ahonen, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 865 days.

(21) Appl. No.: 09/764,661

(22) Filed: Jan. 18, 2001

(65) Prior Publication Data

US 2001/0009025 A1    Jul. 19, 2001

(30) Foreign Application Priority Data

Jan. 18, 2000 (GB) .................................. 00009613

(51) Int. Cl.[7] ............................................. G06F 17/00

(52) U.S. Cl. .................... 713/201; 713/168; 713/175; 713/153

(58) Field of Search ............................ 713/201, 168, 713/175, 153

(56) References Cited

U.S. PATENT DOCUMENTS 5,940,591 A * 8/1999 Boyle et al. ................. 713/201
6,330,562 B1 * 12/2001 Boden et al. ................. 707/10

OTHER PUBLICATIONS

Zao et al., "A public-key based secure Mobile IP", J.C. Baltzer AG, Sceince Publishers, pp. 373-390.*
Reavis, Jim, "Is VPN the killer application for PKI?", Sep. 22, 1999, Network World Fusion.*
Zao et al., A public-key based secure mobile IP, Wireless Networks, vol. 5, Issue 5 (Oct. 1999) pp.: 373-390 Year of Publication: 1999.*

(Continued)

*Primary Examiner*—David Jung
(74) *Attorney, Agent, or Firm*—Roger Burleigh (57) ABSTRACT

A secure communication method for allowing a mobile host to communicate with a correspondent host over a Virtual Private Network. The method comprises negotiating one or more Security Associations between the mobile host and a correspondent host of a Virtual Private Network. Subsequently, a communication is initiated between the mobile host and a Security Gateway and an authentication certificate sent to the Security Gateway, the certificate containing at least the identity of a Security Association which will be used for subsequent communication between the mobile host and the correspondent host. Data packets can then be sent from the mobile host to the correspondent host using the identified Security Association, via the Security Gateway. However, the data packets are forwarded by the Security Gateway to the correspondent host only if they are authenticated by the Security Gateway.

15 Claims, 3 Drawing Sheets

OTHER PUBLICATIONS

Dynamic network-based secure VPN deployment in GPRS Xenakis, C.; Merakos, L.; Personal, Indoor and Mobile Radio Communications, 2002. The 13th IEEE International Symposium on vol. 3, Sep. 15-18, 2002, Page(s).:1260-1265 vol.3.*

An agent-based shopping system Benedicenti, L.; Xuguang Chen; Xiaoran Cao; Paranjape, R.; Electrical and Computer Engineering, 2004. Canadian Conference on vol. 2, May 2-5, 2004 Page(s):703-705, vol. 2.*

Simple mobility support for IPsec tunnel mode Byoung-Jo, K.; Srinivasan, S.; Vehicular Technology Conference, 2003. VTC 2003-Fall. 2003 IEEE 58th vol. 3, Oct. 6-9, 2003 Page(s):1999-2003 vol. 3 Digital Object Identifier 10.1109/VETECF.2003.1285375.*

Jacobs, S., et al., "Security of Current Mobile IP Solutions", Proceedings of the Military Communications Conference, Nov. 3, 1997, pp. 1122-1128, XP 000792591.

Inoue, A., et al., "IP Layer Security and Mobility Support Design Policy and an Implementation", Proceedings of the ISS'97 International Switching Symposium, Toronto, Canada, Sep. 21-23, 1997, pp. 571-577, XP000720565.

Zao, J., et al., "A Public-Key Based Secure Mobile IP", Proceedings of the Mobicom'97 Third Annual ACM/IEEE International Conference on Mobile Computing and Networking, Budapest, Hungary, pp. 26-30, Sep. 1997, XP 000764777.

* cited by examiner

IKE MESSAGES IN Phase 1

Figure 3

QUICK MODE MESSAGES (Phase 2)

VIRTUAL PRIVATE NETWORKS

BACKGROUND

The present invention relates to Virtual Private Networks and in particular to Virtual Private Networks in which a mobile terminal establishes a secure connection with a correspondent host located in an intranet, via a Security Gateway.

There is an ever increasing demand for mobility in communications systems. However, this demand must be met in a manner which provides for the secure transfer of data between communicating parties. A concept known as the Virtual Private Network (VPN) has recently been introduced, with the aim of satisfying, by a combination of encryption and secure access, this demand. A VPN may involve one or more corporate Local Area Networks (LANs) or intranets, as well as users coupled to "foreign" LANs, the Internet, wireless mobile networks, etc.

An Internet Engineering Task Force (IETF) standard known as IPsec has been defined and provides for the creation of a secure connection between parties in a VPN over IPv6. In the IPsec model the end points of the secure connection are identified by their IP addresses. While this may be satisfactory for users having a fixed connection, it does present problems for the mobile user (such as a user who connects to the VPN via a wireless terminal) who wishes to roam between different access networks. The main problem is that the IP address allocated to the roaming mobile user is likely to change dynamically as the user moves between access networks. In the event of an IP address change, it is difficult to reuse the pre-existing security associations (of IPsec) and in the worst case scenario the communicating parties need to make a re-authentication of one another and establish new security associations on the basis of the new IP address(es). This will result in increased signalling traffic and will degrade the performance of the VPN and of the applications being run.

SUMMARY

According to a first aspect of the present invention there is provided a secure communication method for allowing a mobile host to communicate with a correspondent host over a Virtual Private Network via a Security Gateway (SG), the method comprising the steps of:

(1) negotiating one or more Security Associations (SAs) between the mobile host and a correspondent host of a Virtual Private Network (VPN);

(2) subsequently initiating a communication between the mobile host and the SG and sending an authentication certificate to the SG, the certificate containing at least the identity of a SA which will be used for subsequent communication between the mobile host and the correspondent host;

(3) sending data packets from the mobile host to the correspondent host using the identified SA, via the SG; and (4) wherein said data packets are forwarded by the SG to the correspondent host only if they are authenticated by the SG.

Preferably, prior to step (2) of the above method, one or more Security Associations (SAs) are negotiated between the mobile host and the SG and said authentication certificate is sent to the SG using one of these SAs.

Preferably, the authentication certificate sent to the SG contains an IP address of the mobile host. This may be required, for example, when the mobile host has been allocated a new IP address.

Preferably, said SAs are IPsec phase 2 SAs and are used on top of an ISAKMP SA. More preferably, said authentication certificate contains the Internet Security Association Key Management Protocol (ISAKMP) cookies of the mobile host and said correspondent host, with which the phase 2 negotiation was done.

Embodiments of the present invention reduce the amount of security related messaging during on-the-fly IP address changes, as the SAs needed to provide for secure communication between the mobile host and the correspondent host pre-exist. When it is required to initiate a new communication, it is only necessary for the mobile host to authorize the SG to forward packets belonging to a certain SA between the mobile host and said correspondent host.

Preferably, the VPN comprises an intranet, with the SG being coupled between the intranet and the Internet. The SG may also be coupled between the intranet and another network such as a core network of a mobile wireless telecommunications system (such as UMTS).

The mobile host may be a wireless host coupled to the SG via an access network, which may be an access network of a mobile wireless telecommunications system (for example the UTRAN access network of UMTS) or a wireless LAN or WAN. Said correspondent host may also be a mobile host, or it may be a fixed host.

In the case where the VPN comprises an intranet, said correspondent host may reside within the intranet, or may reside outside of the intranet. In the later case, said data packets are forwarded to the correspondent host from the SG over a secure connection. This may be established in the same way as the secure connection between said mobile host and the SG.

In certain embodiments of the present invention, a negotiated SA expires after a predefined volume of data has been sent using the SA. The SG maintains a record of the sent data volume and suspends the SA when the predefined volume is reached.

In certain embodiments of the invention, a negotiated SA is time limited by the SG. At the end of a predefined time limit the SA identity is suspend by the SG.

In the case of cellular access, the data packets sent to the SG in step (3) and which contain user data are authenticated using authentication data sent in separate data packets. For example these separate data packets may contain hashes of the user data. More preferably, the data packets containing user data are sent (possibly encrypted) using a Security Association (SA) negotiated between the mobile host and said correspondent host and the data packets containing authentication data are sent using Security Associations (SA) negotiated between the mobile host and the SG.

According to a second aspect of the present invention there is provided a Security Gateway (SG) of a Virtual Private Network, the SG enabling secure communication between a mobile host and a correspondent host, the SG comprising:

(1) means for negotiating one or more Security Associations (SAs) between the mobile host and the Security Gateway (SG);

(2) means for subsequently initiating a communication between the mobile host and the SG using a negotiated SA and for receiving an authentication certificate sent from the mobile host, the certificate containing at least the identity of the mobile host and an IP address of the mobile host;

(3) means for receiving data packets sent from the mobile host and for authenticating the data packets; and (4) means for forwarding the data packets from the SG to said correspondent host providing that the received data packets are authenticated.

According to a third aspect of the present invention there is provided a secure communication method for allowing a mobile host to communicate with a correspondent host over a Virtual Private Network, the method comprising the steps of:

(1) negotiating one or more Security Associations (SAs) between the mobile host and a Security Gateway (SG) of a Virtual Private Network (VPN);

(2) subsequently initiating a communication between the mobile host and the SG using a negotiated SA and sending an authentication certificate to the SG, the certificate containing at least the identity of the mobile host and an IP address of the mobile host;

(3) sending data packets from the mobile host to the SG and authenticating the data packets at the SG; and (4) providing that the received data packets are authenticated, forwarding the data packets from the SG to said correspondent host.

DETAILED DESCRIPTION

The method which will now be described makes use of features described in the following documents, the contents of which are incorporated by reference herein: [IPsec] RFC 2401, Security Architecture for the Internet Protocol, November 1998; [REKEY] Internet Draft, IPsec Re-keying Issues; [IKE] RFC 2409, The Internet Key Exchange (IKE), November 1998; [ISAKMP] RFC 2408, Internet Security Association and Key Management Protocol, November 1998; [INTDOI] RFC 2407, The Internet Security Domain of Interpretation for ISAKMP, November 1998. Reference should be made to these documents for a fuller understanding of the method.

Figure 1:
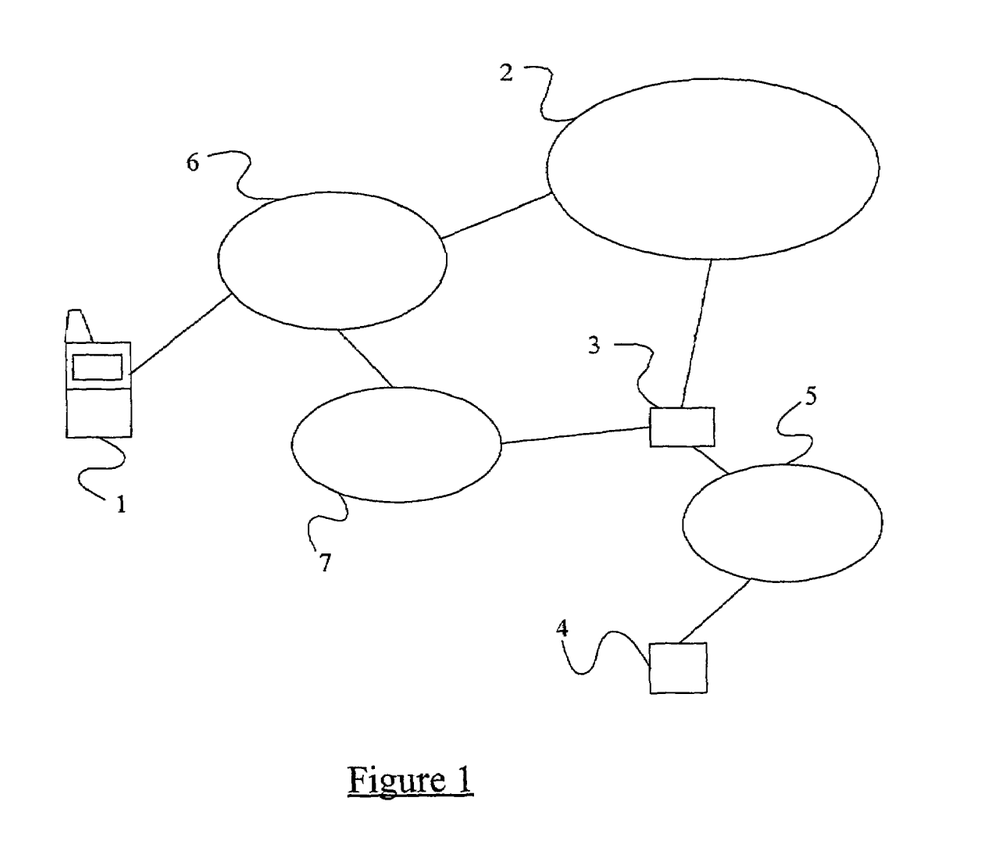
FIG. 1 illustrates schematically a Virtual Private Network (VPN) comprising an intranet.

FIG. 1 illustrates a situation where a remote mobile host 1 uses the Internet 2 to connect to an organization's firewall or Security Gateway (SG) 3, and then to gain access to some correspondent host (e.g. a server or other machine) 4 connected to the organization's intranet (i.e. corporate LAN) 5. An access network 6 couples the mobile host 1 to the Internet 2. FIG. 1 also illustrates an alternative path for coupling the mobile terminal 1 to the intranet 5 and which involves a core network 7. A secure connection between the mobile host 1 and the correspondent host 4 is facilitated using "daemons" which work inside the mobile host 1, the firewall 3, and the correspondent host 4. The specific solution presented here, and which is further described below, utilizes:

traffic counters;

a continuous channel method (REKEY) to always maintain at least one valid phase 1 Security Association (SA) between the mobile host 1 and the firewall 3 and also between the mobile host 1 and the correspondent host 4;

the "pre-creation" of multiple similar (phase 2) SAs;

control certificates which are sent between the mobile host 1 and the firewall 3 to block or pass traffic associated with certain pre-created phase 2 SAs;

a mechanism in the firewall 3 to block or pass traffic through the firewall 3, according to received control certificates and overall corporate policy;

a potential for (partially) separating authentication from the encrypted traffic (the user layer data traffic can be sent immediately as encrypted, but the authentication data fields (e.g. hashes) for that data traffic can be delayed and sent a short time later, e.g. in grouped into bursts). This applies in particular to access over cellular links.

The method, which may be referred to as a "certificate based firewall method", can be divided into three main functions:

a preparations function which, in its simplest form, is carried out at a preliminary stage when the mobile host 1 is "physically" located within the intranet 5;

a remote control function which is carried out during the mobile host's remote access to the intranet 5; and a traffic enforcement function which is also carried out during the remote access stage.

Each of these functions will now be considered in turn.

The Preparations Function (Phase 1)

Figure 2:
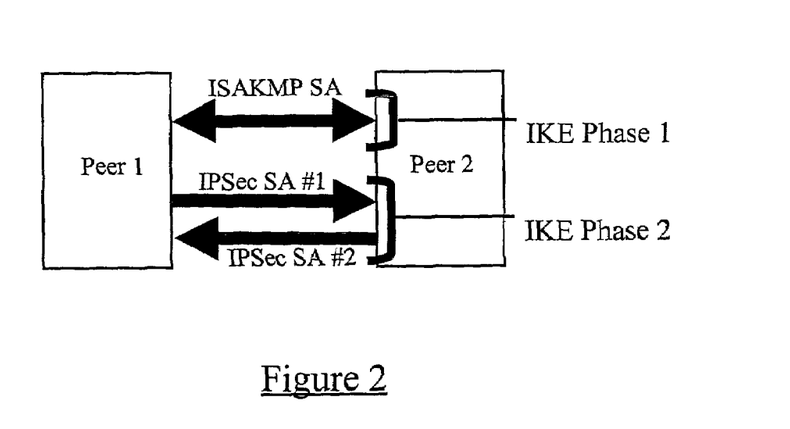
FIG. 2 illustrates at a general level the signalling between two nodes of the VPN of FIG. 1 during a secure data connection establishment process.

While the mobile host 1 is located within the intranet 5, the preparations for future lightweight and secure remote access are made in one example using standard techniques. First, a single ISAKMP Security Association (SA) is negotiated between the mobile host 1 and the firewall 3. The ISAKMP SA provides protection for the IKE messaging itself. Second, several pairs (or in the case of a highly memory limited device only a single pair) of IPsec Security Associations (SA) are established for the purpose of protecting actual user data traffic. The phase 2 message exchange is carried out under the protection of the established ISAKMP SA. The overall process is illustrated generally in FIG. 2. This process is then repeated in order to negotiate a separate ISAKMP SA between the mobile host 1 and the correspondent host 4 as well as separate pairs of IPsec SAs.

Figure 3:
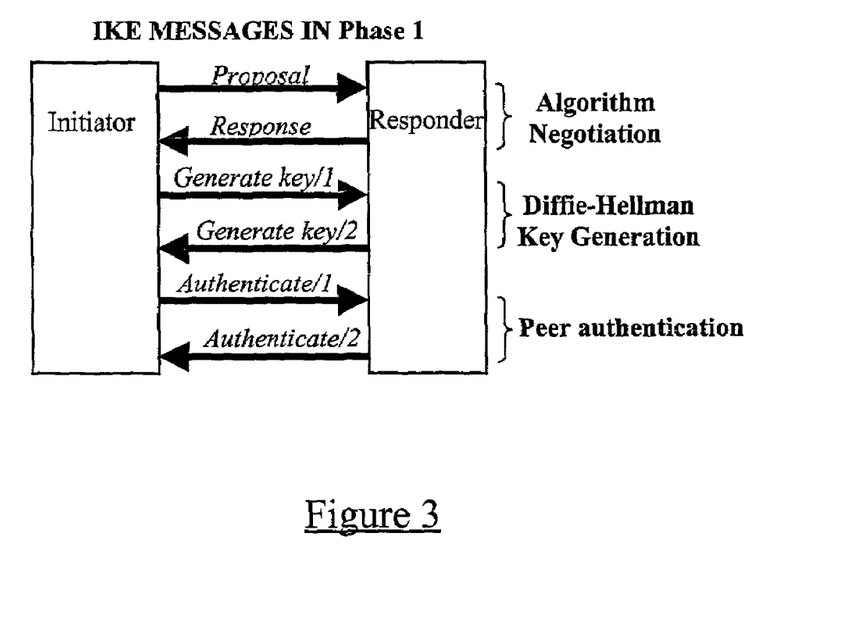
FIG. 3 illustrates at a more detailed level the signalling involved in an IKE phase 1 of the process of FIG. 2.

FIG. 3 illustrates in more detail the messages exchanged during each of the ISAKMP SA negotiation phases, and which consist of 3 different types of message in a certain order (this example relates to "main" mode—"aggressive" mode may be preferred in certain circumstances). These message types provide for, in order, algorithm negotiation, secret key generation, and peer authentication. The algorithm negotiation phase will be considered first.

In the present scenario, the size of the intranet 5 is considered to be large (hundreds or thousands of nodes). Therefore, it is assumed that IKE is used to obtain authenticated keying material for use with the ISAKMP and IPsec security associations. The following attributes are used by IKE and are negotiated as part of the ISAKMP Security Association (mandatory supported values in parenthesis):

encryption algorithm,
hash algorithm (MD5 and SHA),
authentication method (via pre-shared keys),
information about a group over which to do Diffie-Hellman (MODP over group no:1).

It is noted that the ISAKMP uses the Initiator and Responder cookie fields in the ISAKMP header to identify the particular ISAKMP SAs for itself. The creation of an Anti-Clogging Token ("Cookie") is implementation dependent, but must satisfy the following basic requirements [ISAKMP]:

The cookie must depend on the specific parties. This prevents an attacker from obtaining a cookie using a real IP address and UDP port, and then using it to swamp the victim with Diffie-Hellman requests from randomly chosen IP addresses or ports.

It must not be possible for anyone other than the issuing entity to generate cookies that will be accepted by that entity. This implies that the issuing entity must use local secret information in the generation and subsequent verification of a cookie. It must not be possible to deduce this secret information from any particular cookie.

The cookie generation function must be fast enough to protect against attacks intended to wear down CPU resources. (The suggested method for creating the cookie is to perform a fast hash (e.g. MD5) over the IP Source and Destination Address, the UDP Source and Destination Ports and a locally generated secret random value. ISAKMP requires that the cookie be unique for each SA established, to help prevent replay attacks—therefore, the date and time must be added to the information hashed.

It is further noted that the Domain of Interpretation (DOI) field in the phase 1 negotiation can be used to expand the syntax and semantics of Identities. Therefore, the present implementation is not bound to the Identities currently defined for the Internet domain. Security protocols sharing a DOI, choose security protocol and cryptographic transforms from a common namespace and share key exchange protocol identifiers. They also share a common interpretation of DOI-specific payload data content, including the Security Association and Identification payloads. [INTDOI])

Two particularly interesting "Identification Payload" types (used to identify the initiator and the responder of the SA) currently defined for Internet Domain [INTDOI], include:

ID_DER_ASN1_DN type specifies the binary DER encoding of an ASN.1 X.500 Distinguished Name of the principal whose certificates are being exchanged to establish the SA, ID_DER_ASN1_GN type specifies the binary DER encoding of an ASN.1 X.500 GeneralName of the principal whose certificates are being exchanged to establish the SA, Other alternatives include:
ID_IPV4_ADDR type specifies a single four (4) octet IPv4 address,
ID_FQDN type specifies a fully-qualified domain name string,
ID_USER_FQDN type specifies a fully-qualified user-name string,
ID_IPV6_ADDR type specifies a single sixteen (16) octet IPv6 address
ID_IPV6_ADDR_SUBNET type specifies a range of IPv6 addresses,
ID_KEY_ID type specifies an opaque byte stream which may be used to pass vendor-specific information necessary to identify which pre-shared key should be used, for example, to authenticate Aggressive mode negotiations.

As will be apparent from the list above, different versions of IP addresses, domain and user names, principal name encoding, and vendor specific ID information can be preferred during the ISAKMP SA negotiations. However, the selected ID type will strongly affect the mobility properties of later secure connections. Note that when an IKE exchange is authenticated using certificates, any ID's used for input to local policy decisions should be contained in the certificate used in the authentication of the exchange.

Considering now the second stage of the phase 1 message exchange (illustrated in FIG. 3), this involves establishing an authenticated key exchange, which generates authenticated keying material from a Diffie-Hellman exchange. This process will create a shared secret between the communicating parties (i.e. the mobile host 1 and the firewall 3 and the mobile host 1 and the correspondent host 4), which is hence only available for communication between those two parties.

The DH exchange messages will carry Diffie-Hellman (DH) public values and ancillary data (e.g. nonces) necessary for the exchange. Normally (in main mode), one message needs to be transferred in both directions, and the result is a common shared secret at both ends. (On the other hand, also the "Quick Mode", must be implemented in the stack to generate fresh keying material and negotiate NON-ISAKMP security services.)

The third stage of phase 1 involves the authentication of the peers. As has been discussed above, the authentication method for the exchange has already been negotiated (during IKE negotiation) from four different types of candidates:
digital signature,
authentication with public key encryption (two different),
pre-shared key.

Now, the selected authentication method will be applied in this authentication exchange, and the result will be three groups of authenticated keying material (keymat):
the keymat used by the ISAKMP SA to protect the confidentiality of its messages,
the keymat used by the ISAKMP SA to authenticate its messages,
the keymat used to derive keys for non-ISAKMP security associations.

This keying material is proven to be authentic, because both the initiator and the responder generate a hash value from a specific set of the exchanged information (including the corresponding ID of the ISAKMP party). Each party's ability to reconstruct the hash (from the received authentication message) will authenticate the exchange.

If the signature authentication method has been negotiated, the authentication "seed" (nonce) will be exchanged during the DH exchange. Then, the authenticity of the exchange is assured by signing a mutually obtainable hash.

When using public key encryption to authenticate the exchange, the nonce and the identities of the parties will be exchanged during the DH exchange, but now being encrypted with the public key of the receiver. Each party's ability to reconstruct a hash authenticates the exchange. However, in order to perform the public key encryption the initiator must already have the responder's public key. (A hash of the certificate the initiator used to encrypt the ancillary information could also be passed as part of the authentication message.) Note that authentication with public key encryption allows for identity protection with Aggressive Mode.

In a third alternative, authentication is achieved using a revised mode of public key encryption. This authentication mode retains the advantages of public key encryption but works with only two public key operations. In the exchanged message, only the nonce is encrypted with the public key, but the identity related information is encoded using the negotiated symmetric encryption (with a key derived from the nonce). Optionally, a certificate payload may be attached to the DH key exchange message to provide the responder with a public key with which to respond.

For extra protection of the Diffie-Hellman, the DH "public information" is also encrypted using the same symmetric key, instead of clear text. Note that these symmetric keys are ephemeral and must be discarded after use.

In the fourth alternative, a key retrieved by some off-line mechanism may be used to authenticate the IKE exchange. When using pre-shared key authentication with Main Mode, the key can only be identified by the IP address of the peers. Fortunately, the Aggressive Mode allows for different identifiers to be used. In addition, it allows parties to maintain multiple pre-shared keys and the means to identify the corresponding key for a particular exchange.

The Preparations Function (Phase 2)

Phase 2 is where Security Associations are negotiated between the mobile host 1 and the firewall 3, and between the mobile host 1 and the correspondent host 4, for services such as IPsec, which need key material or parameter negotiation. As with phase 1, this is carried out while the mobile terminal 1 is located within the intranet 5. A single ISAKMP SA may be used as a basis for several IPsec SAs which, if desired, can be negotiated in a single phase 2 sequence. The positive consequence of these optimizations can lead to less than one messaging round trip, and less than one DH exponentiation, per IPsec SA [IKE].

Each ISAKMP SA (Phase 1) is bi-directional, which means that after it has been established, either party may initiate "Quick Mode", "Informational", and "New Group Mode" exchanges. The Quick Mode provides a phase 2 exchange and is a mandatory mechanism to generate fresh keying material and negotiate non-ISAKMP security services. Quick Mode is basically a SA negotiation and an exchange of Nonces that provides replay protection. (The New Group Mode is a mechanism to define private groups for Diffie-Hellman exchanges.)

Figure 4:
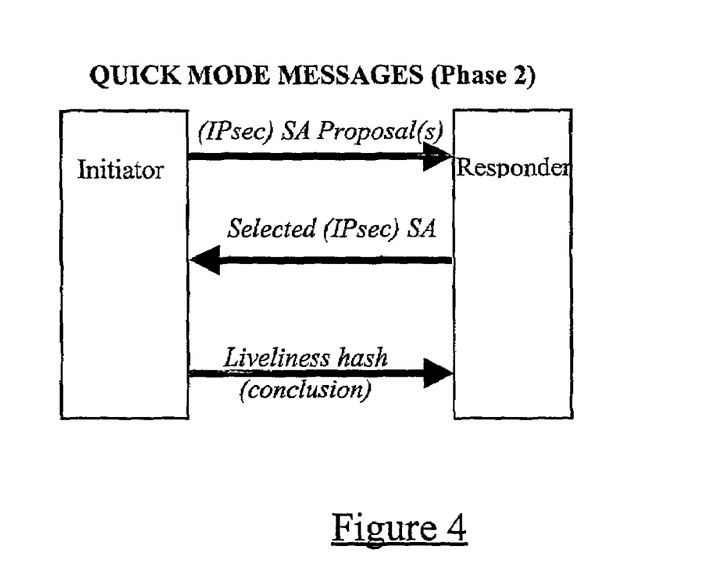
FIG. 4 illustrates a Quick Mode message exchange of an IKE phase 2 of the process of FIG. 2.

All offers made during a Quick Mode are logically related. For example, if a Diffie-Hellman payload is sent (optional), the DH group must be included in every transform of every SA being negotiated. Similarly, if the Client Identities are used, they must apply to every SA in the negotiation. The message exchange in Quick Mode is illustrated in FIG. 4, where:

"IPsec SA Proposal(s)" message includes an IPsec SA negotiation payload (with one or more proposals), an initiator Nonce, a hash of the message, and optionally a Diffie-Hellman payload and Client Identities, "Selected IPsec SA" message includes the IPsec SA negotiation payload (only one SA selected), a responder Nonce, and a hash of the message, and optionally a Diffie-Hellman payload and Client Identities, "Liveliness hash" message includes a hash over, e.g. a concatenation of the message ID and the Initiator's and responder's Nonce minus the payload header.

As mentioned above, a single phase 2 negotiation can simultaneously request multiple Security Associations, but the repeated re-keying using Quick Mode could consume the entropy of the Diffie-Hellman shared secret. Therefore, in order to preserve good privacy, an upper threshold value should be configured in the stack for the Quick Mode Exchanges.

The Nonces are used to GENERATE fresh key material and prevent replay attacks. However, the Quick Mode (without the optional Diffie-Hellman payload) only refreshes the old keying material derived from the exponentiation in phase 1. This does not provide Perfect Forward Secrecy. Using the optional Diffie-Hellman payload (e.g. every now and then), an additional exponentiation is performed and Perfect Forward Secrecy is provided for the keying material.

The result of this process is that SAs (phase 1 and phase 2) are established between the mobile host 1 and the firewall 3, and between the mobile host 1 and the correspondent host 4. It will be appreciated that the mobile host may additionally establish SAs with a second (or subsequent) correspondent host. Details of the negotiated SAs are held at the firewall in a Security Association Database (SAD) and at the end of the negotiation process the firewall 3 transfers the SAD from the intranet side interface to the external side interface of the IPsec protocol stack. This makes it possible for the mobile host 3 to make use of the pre-created IKE phase 1 and phase 2 SAs from outside of the intranet 5.

To conclude the preparations function, the mobile host 1 will send a specific formatted authorisation certificate to the firewall 3 (if outside the intranet 5, a temporary secured IPsec channel could be established for this certificate transfer). This certificate includes at least a formatted list of identities of the phase 2 SAs that were pre-created during the Quick Mode between the mobile host 1 and the correspondent host 4. The information about each SA in the list could consist of:

the Source and Destination IP addresses,
the ISAKMP Cookies of the mobile host 1 and the correspondent host 4 (under which the phase 2 negotiation was done),
the IPsec protocol ID (AH, ESP)
the SPI number of the particular phase 2 SA (incoming and outgoing separated),
the Initial sequence number [and Initialization vector] of the particular phase 2 SA,
the Expiration clause of the phase 2 SA (which was negotiated using the Quick Mode in the beginning of the Preparations function. In the present proposal, this should be expressed (at least) in the form of "maximum number of bytes processed"),
the Traversal Threshold is the remote controlled limit for this phase 2 SA to be "activated" (initially set to 0),
a Remote Control flag indicating whether this SA has been "activated" by the mobile host 1 from outside of the intranet 5. Initially, in the Informational certificate, this flag is set to "Off" which means that the corresponding phase 2 SA has not been activated by the Remote Control function.

The contents of the received authorisation certificates are stored in a nominal (secure) database, referred to here as a Remote Control DataBase (RCDB), within the firewall 3. This database is then subsequently maintained by the firewall 3. For example, expired phase 2 SA IDs are deleted automatically from the Remote Control Database.

The firewall 3 is now ready to serve the mobile host 1 and the correspondent host 4 traffic via the Remote Control function. Note that it is also possible to carry out the "preparations function" while the mobile host 1 is outside the intranet 5 (the mobile host 1 can order the firewall 3 to pass also ISAKMP signalling messages between the mobile host 1 and the correspondent host 4).

The Remote Control Function

The remote control function is used by the mobile host 1 to remotely "activate" preexisting secure connections to the correspondent host 4. If the mobile host user travels away from the intranet 5, the SAs which were created during the preparations function stage can be brought into use. However, before that, the mobile host 1 must register itself to the access network. This registration can be carried out in a standard way, depending on the authentication system that the visited access network requires. Furthermore, the mobile host 1 might be required to use a new IP address when communicating via access network—for example, DHCP server of the access network might enforce new IP addresses on all visiting hosts.

Considering again the scenario where the mobile terminal 1 wishes to use a service located at the correspondent host 4 inside the intranet 5 it will be appreciated that the mobile host 1 first needs to convince the firewall 3 that subsequently sent messages originating from the mobile host 3 to the correspondent host 4 should be passed. The following certificate exchange, carried out using a phase 1 SA and (optionally) a phase 2 SA previously negotiated between the mobile host 1 and the firewall 3, accomplishes this:

1. The mobile host 1 sends a control authorisation certificate to the firewall 3. This certificate refers to the certificate that was transmitted in the end of the Preparations function, and could consist of:
   the cryptographic identity of the mobile host 1;
   the (New) Source and Destination IP addresses (if changed);
   the ISAKMP Cookies of the mobile host 1 and the correspondent host 4, (under which the phase 2 negotiation was done);
   the IPsec protocol ID (AH, ESP);
   the SPI number of the phase 2 SA (usually the next available SA which was created during the preparations functions and which has not expired);
   current sequence number of the requested phase 2 SA (if this SA has been used earlier, then this number has increased in the counter of mobile host 1);
   Traversal Threshold must be expressed in the form of "Maximum allowed number of bytes", which are processed by the encryption algorithm specified for this IPsec SA. The number of bytes must not overdraw the SA expiration clause.
2. The firewall 3 receives the control authorisation certificate. This input is compared with the contents of the RCDB within the firewall 3. The firewall 3 identifies whether or not any record in RCDB for this mobile host 1 matches with the three corresponding input fields received in the control certificate, i.e.:
   the ISAKMP Cookies of the mobile host 1 and the correspondent host 4;
   the IPsec protocol ID (AH, ESP);
   the SPI number.
3. If a match is found, then the following updates are made to the matched (RCDB) record within firewall 3:
   the Source and Destination IP addresses are updated if they are changed;
   the Traversal Threshold is set to a (new) value (copied from the control certificate);
   the Remote Control flag is set to "On";
   the Initial Sequence number will be set to the current sequence number.
4. If a match was indeed found and the RCDB updated, the firewall 3 will send an "ACK" (acknowledgement) message back to the mobile host 1. Otherwise, a "NACK" message is sent to the mobile host 1 (denied).

If the source IP address was changed, the firewall 3 will also forward the new Source and Destination IP addresses to the correspondent host 4, which identifies the appropriate SA via ISAKMP Cookies, IPsec protocol ID, and SPI number, which are also attached to the message. Now the correspondent host 4 can modify its SAD database to correctly reflect the change of the mobile host's IP address to the new valid one. (This doesn't mean that all SAs that are associated between the mobile host 1 and the correspondent host 4 need to be modified in the SAD, because the mobile host 1 might travel back to the previous wireless access network. The received message will mention the explicit SAs.)

Traffic Enforcement Function

After the mobile host 1 has received the "ACK" message from the firewall 3, the mobile host 1 can begin to send application traffic to the correspondent host 4 by utilizing the acknowledged phase 2 SA (between the mobile host 1 and the correspondent host 4). In addition to the normal IP processing, the following check will be done in the firewall 3. All incoming packets (which are transmitted through the firewall 3) are required to be Remote Controlled. That is to say that a packet must be discarded in the firewall 3 if the packet cannot be identified as belonging to a certain (precreated) phase 2 SA. The identification is done by comparing the packet with the content of the RCDB in firewall 3.

As a general rule, the traffic enforcement process functions in the following way:

Every incoming packet must first be assumed to belong to some phase 2 SA previously negotiated between the mobile host 1 and the correspondent host 4. Therefore, the firewall 3 will investigate the following fields of each of packet:
   the Source and Destination IP addresses,
   the IPsec protocol ID (AH, ESP),
   the SPI number of the particular phase 2 SA,
   the sequence number of the particular phase 2 SA.

If a matching record is found from the RCDB, the number of encrypted payload bytes is counted for this incoming packet. The result is added to the cumulative value for the associated IPsec phase 2 SA, which will be stored in the (RCDB specific) traffic counter. The purpose of the RCDB specific traffic counter is to store the cumulative number of bytes that should have been encrypted at the sending mobile host 1, if all of the incoming packets from the mobile host 1 and destined for the correspondent host 4 had been authentic and error free. This allows the communicating parties to notice at an early stage if, for example, replay or denial of service attacks have been run against them.

More importantly, if the matching record was resident in the RCDB, and if the values in the matching record were:
   the current sequence number<the sequence number of the packet, and if,
   the Traversal Threshold>cumulative value (for the associated IPsec phase 2 SA), and if,
   a Remote Control flag=(equals) "On", then the incoming packet is identified, but cannot yet be passed through the firewall 3 to the intranet 5.

(NB. The expired phase 2 SA IDs will be deleted automatically from the RCDB by the firewall 3. The "Traversal Threshold", received in the control authorisation certificate, will mandate when the "Remote Control flag" belonging to the matching RCDB record must be set back to "Off" again. The daemon within the firewall 3 can do this by comparing the cumulative value (for the associated IPsec phase 2 SA) with the Traversal Threshold.)

The identified packet must now be cryptographically authenticated, one of the main functions of the firewall 3. In the following, a description is given of how this purpose can be satisfied together with the true end-to-end security and minimal packet overhead requirements:

The "normal" practice in IPsec is that the sender MUST apply the transport header before the tunnel header. In this case, the correspondent host 4 destined part of the packet can be authenticated right away. This is because the authenticating header (AH) can be terminated (and processed) in the Firewall.

We can require, for packet overhead reasons, that at most one IPsec header per packet should be constructed by the sending mobile host 1. In this case, the ESP header could be used with both encryption and authentication algorithms. The packet overhead due to IPsec would be minimal. We then need to decide (during the preparation function), where the receiving end of the secured connection will be terminated. If end-to-end encryption is required, the packet cannot be authenticated at the firewall 3 in a straightforward fashion, because the necessary secret authentication keys reside only at the mobile host 1 and the correspondent host 4.

The solution presented here is that only one IPsec header is attached per packet, with the traffic being divided into enciphered data packets and data authentication packets. The former is used to send the actual data (as encrypted) from the mobile host 1 to the correspondent host 4. The latter will carry the authentication data (hashes) of the encrypted messages (if required). In other words, the encrypted user data is sent using a SA negotiated between the mobile host 1 and the correspondent host, while the authentication data for the firewall 3 is sent using a SA negotiated between the mobile host 1 and the firewall 3.

The traversal enforcement at the firewall 3 can operate in different authentication enforcement "levels" depending on the service. It is assumed that all packets are at least encrypted by the sending party. Three different authentication enforcement levels are recognized at the firewall 3:

A. traffic counter based "authentication",
B. postponed authentication, and
C. on-line authentication.

The traffic counter based "authentication" is not actually a cryptographic authentication method. The firewall 3 is ensuring (via its RCDB) that only the mobile host 1 activated SAs can communicate through it. If a packet's sequence number is increasing correctly, the Remote Control flag is "On", and the cumulative amount of transferred traffic is below the "Traversal Threshold" of the particular SA, then the packet will be passed through the firewall 3. This method relies to the belief that no other node (e.g. an attacker) is able to know the details of the currently valid SA between the mobile host 1 and the correspondent host 4. During the preparations function, the mobile host 1 and the correspondent host 4 have created shared secrets between them, which have never been openly transferred (due Diffie-Hellman exchange), or even in encrypted form. In this case, all the intranet nodes are required to maintain strict security policy, which will enforce strong end-to-end authentication within their communication.

It will be the case that certain wireless applications will not require the full authenticity of transferred data bits. Therefore, it will be unnecessary to add the fall hash (or MAC) overhead to each of these messages. The traffic counter-based "authentication" should be used as an underlying method also in methods B and C.

In the Postponed authentication, both the encryption and authentication algorithms are used by the mobile host 1 in the ESP header. In this authentication method, the firewall 3 functions similarly to the firewall of method A, but with the correspondent host 3 being responsible for sending ACK (or NACK, respectively) messages to notify the firewall 3 about the received packets. If the firewall 3 recognizes that it has passed packet(s) that were not authentic at the correspondent host 4, it will become strongly suspicious of the corresponding SA. For example, the firewall 3 might require that a new "Remote Control function" needs to be initiated by the mobile host 1. If authentication problems are still occurring, all appropriate pre-created SA IDs in the firewall 3 can be marked as "SUSPECT", and the firewall 3 can refuse to allow a "Remote Control function" for them. In this case, the mobile host 1 must begin from "scratch" and is forced to establish a new IKE phase 1 and phase 2 SAs.

In the On-line authentication, the firewall 3 will hold the encrypted data packets belonging to a certain Identified SA. The mobile host 1 is responsible for taking keyed hash over each packet that is going to be sent to the firewall 3. For example, the key for the hash can be taken from the SA that is used for communication between the mobile host 1 and the firewall 3 (which is maintained using the continuous channel method). The mobile host 1 sends the hashes to the firewall. The firewall 3 can then compare these hashes with those which the firewall 3 can calculate itself by using the same key for the encrypted packets (that are cached into firewall memory). Only the authenticated packets (which hash match with the ones received from the mobile host 1) will be passed through by the firewall 3. It will be appreciated that this authentication method cannot be used for real time data.

Figure 5:
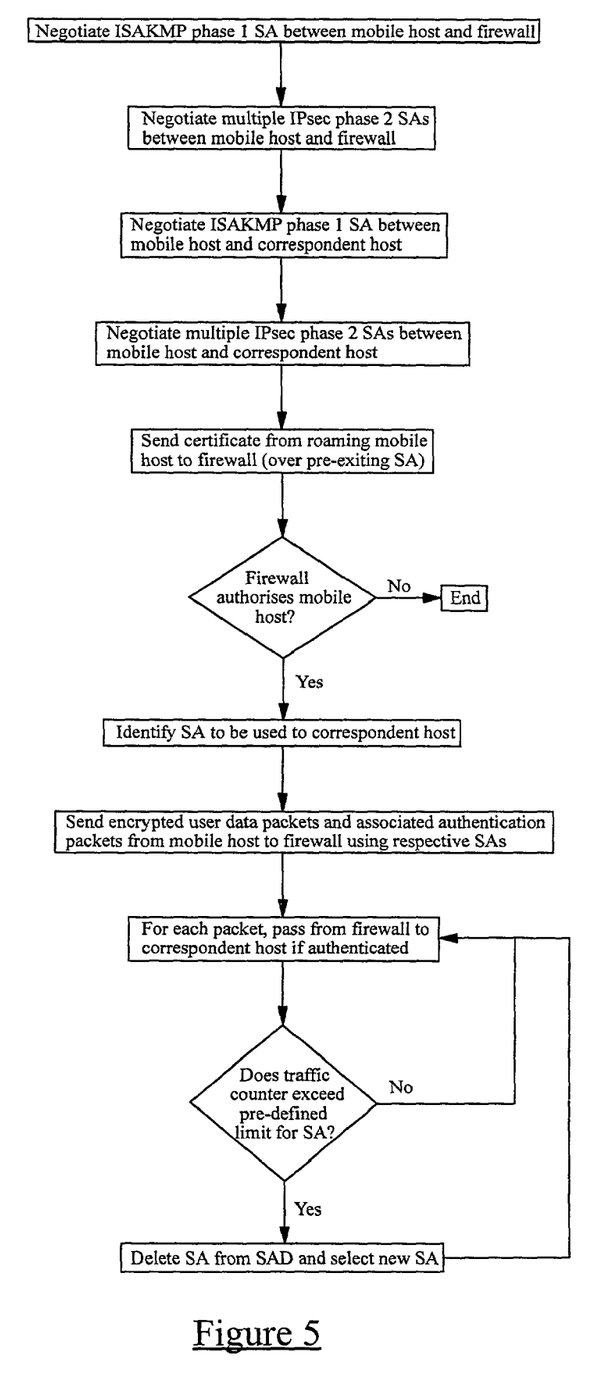
FIG. 5 is a flow diagram illustrating a secure communication method according to an embodiment of the present invention.

FIG. 5 is a flow diagram illustrating in general terms the secure communication method described above.

The solution proposed here has several security-related benefits, for example:

the firewall 3 will pass mobile host 1 originating traffic through the intranet 5 only if the mobile host 1 has ordered it (in Remote Control function). For example, the "Traversal Threshold" can be actively controlled by the mobile host 1 (and the firewall 3) and can be mandated to be small, if desired. Of course, the SA entry can be deleted or suspended, if the protection is thought to have been compromised.

much of the IKE signalling is done at an prior to the remote connection, before the application data transfer, thus minimizing delays due to round trip times, minimal processing of data packets at the firewall 3. However, if on-line cryptographic authentication is preferred, it can be enforced at the firewall 3 without the authentication overhead in the corresponding user data packets, minimal packet size due to the separation of authentication and data, utilizes many existing security mechanisms, as extensions to the IETF IKE & IPsec related standards are not generally necessary, the communicating parties can notice at an early stage if, for example, replay- or DoS attacks have been run against them.

It will be appreciated by the person of skill in the art that various modifications may be made to the above described embodiments without departing from the scope of the present invention.

What is claimed is:

1. A secure communication method for allowing a mobile host to communicate with a correspondent host over a Virtual Private Network via a Security Gateway, the method comprising the steps of:
   - negotiating at least one Security Association between the mobile host and the Security Gateway;
   - negotiating at least one Security Association between the mobile host and a correspondent host of a Virtual Private Network;
   - initiating a communication between the mobile host and the Security Gateway and sending an authentication certificate to the Security Gateway, the certificate including data identifying a Security Association which will be used for subsequent communication between the mobile host and the correspondent host; and
   - sending data packets, via the Security Gateway, from the mobile host to the correspondent host using the identified Security Association;
   - wherein said data packets are forwarded by the Security Gateway to the correspondent host only if they are authenticated by the Security Gateway.

2. The method according to claim 1, comprising the additional step of sending said authentication certificate to the Security Gateway using one of the at least one Security Associations between the mobile host and the Security Gateway.

3. The method according to claim 2, wherein the data packets which contain user data are authenticated by the Security Gateway using authentication data sent in separate data packets, and wherein the data packets containing user data are sent using a Security Association negotiated between the mobile host and said correspondent host and the data packets containing authentication data are sent using a Security Association negotiated between the mobile host and the Security Gateway.

4. The method according to claim 1, wherein said authentication certificate comprises data indicating an IP address of the mobile host.

5. The method according to claim 1, wherein said at least one Security Association is an IPsec phase 2 Security Association and is used on top of an Internet Security Association Key Management Protocol Security Association.

6. The method according to claim 5, wherein said authentication certificate contains Internet Security Association Key Management Protocol cookies of the mobile host and said correspondent host with which the phase 2 negotiation was done.

7. The method according to claim 1, wherein the Security Gateway is coupled between the intranet and a core network of a mobile wireless telecommunications system.

8. The method according to claim 1, wherein the mobile host is a wireless host coupled to the Security Gateway via an access network.

9. The method according to claim 1, wherein the Virtual Private Network comprises an intranet, with the Security Gateway being coupled between the intranet and the Internet.

10. The method according to claim 9, wherein said correspondent host resides within the intranet and said data packets are forwarded to the correspondent host from the Security Gateway over a secure connection.

11. The method according to claim 1, wherein a negotiated Security Association expires after a predefined volume of data has been sent using the Security Association.

12. The method according to claim 1, wherein a negotiated Security Association is time limited by the Security Gateway and, after a predefined time limit the Security Association is suspended by the Security Gateway.

13. The method according to claim 1, wherein the data packets which contain user data are authenticated by the Security Gateway using authentication data sent in separate data packets.

14. A Security Gateway of a Virtual Private Network, the Security Gateway enabling secure communication between a mobile host and a correspondent host, the Security Gateway comprising:
   (1) means for negotiating one or more Security Associations between the mobile host and the Security Gateway;
   (2) means for subsequently initiating a communication between the mobile host and the Security Gateway using a negotiated Security Association and for receiving an authentication certificate sent from the mobile host, the certificate including data identifying the mobile host and an IP address of the mobile host;
   (3) means for receiving data packets sent from the mobile host and for authenticating the data packets; and
   (4) means for forwarding the data packets from the Security Gateway to said correspondent host only if the received data packets are authenticated.

15. A secure communication method for allowing a mobile host to communicate with a correspondent host over a Virtual Private Network, the method comprising the steps of:
   (1) negotiating one or more Security Associations between the mobile host and a Security Gateway of a Virtual Private Network;
   (2) initiating a communication between the mobile host and the Security Gateway using a negotiated Security Association and sending an authentication certificate to the Security Gateway, the certificate including data identifying the mobile host and an IP address of the mobile host;
   (3) sending data packets from the mobile host to the Security Gateway and authenticating the data packets at the Security Gateway; and
   (4) forwarding the data packets from the Security Gateway to said correspondent host only if the received data packets are authenticated.

* * * * *